May 6, 1958
E. F. WORTHEN
2,833,871
PHASE INVERTER
Filed March 12, 1957
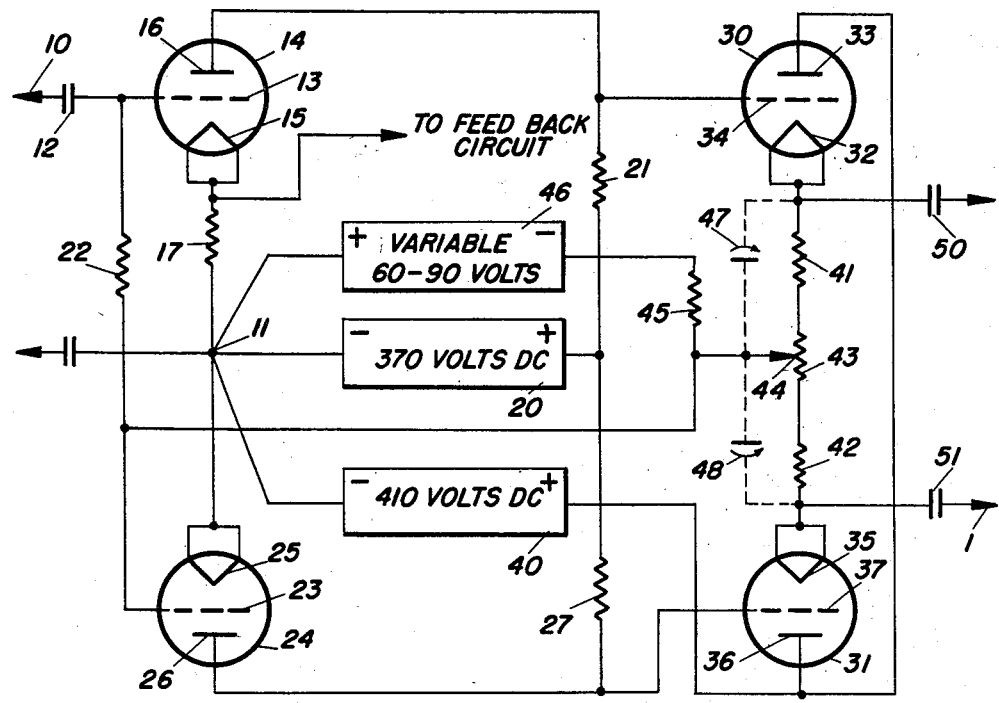
ELGIN FREMONT WORTHEN
*INVENTOR.*
BY
*Hurvitz & Rose*
ATTORNEYS United States Patent Office 2,833,871
Patented May 6, 1958

2,833,871

PHASE INVERTER

Elgin Fremont Worthen, Manchester, N. H.

Application March 12, 1957, Serial No. 645,586

11 Claims. (Cl. 179—171)

The present invention relates generally to phase inverters, and more particularly to wide-band high fidelity phase inverters suitable for driving directly relatively high power balanced power-amplifier stages.

Conventional phase inverters are subject to certain faults. They normally provide low gain, and in many cases a gain of less than unity, so that a driver stage has commonly been required intermediate the phase inverter and the power output stage of a high power amplifier system. They are generally incapable of precise balance over a wide range of frequencies, so that unbalance must be compensated for in the amplifier system, as by means of negative feed-back, or the like. They are usually unbalanced due to variation of tube constants, or of circuit parameters, due to aging, even when initially perfectly balanced, and are not readily re-balanced by unskilled personnel.

It is a primary object of the present invention to provide a phase inverter which is inherently self-balancing.

It is a further object of the present invention to provide a novel phase inverter which is self-balancing as to both input signals and as to bias voltages.

A further object of the invention resides in the provision of a direct coupled phase inverter, having no low frequency phase shift between its two phases as a function of frequency.

It is another object of the invention to provide a phase inverter both sides of which are fully balanced capacitively to ground at all frequencies, and which provides output signal of high amplitude in a pair of balanced cathode loads.

It is still another object of the invention to provide a system of phase inversion requiring only two tube envelopes, and no capacitors, so that all phase shifts may be either 0° or 180°, precisely.

The above and still further objects, features and advantages of the present invention will become apparent upon consideration of the following detailed description of one specific embodiment thereof, especially when taken in conjunction with the accompanying drawings, wherein the figure is a schematic circuit diagram of a phase inverter according to the present invention.

I now describe a specific and preferred circuit according to the invention, in respect to both arrangement and preferred theory of operation.

Input signal is applied between a terminal 10 and a reference point 11, and via coupling capacitor 12 to the control electrode 13 of a first triode 14. The triode 14 further includes a cathode 15 and an anode 16, the cathode 15 being connected to reference point 11 via a load resistance 17. The latter may serve for application of feedback signal, from a driven stage of a complete amplifier system, if desired.

A source of D. C. voltage is provided, which is connected at its negative terminal to the reference point 11 and at its positive terminal via a load resistance 21 to the anode 16.

The control electrode 13 of triode 14 is connected via a relatively high resistance 22 (470K) to a control electrode 23 of a second triode 24. The latter includes a cathode 25 and an anode 26. The cathode 25 is connected directly to the reference point 11, while the anode 26 is connected via a load resistance 27 to the positive terminal of source 20. Resistances 21 and 27 are equal, and may have values of 820K, while cathodes resistance 17 may have a relatively small value, say 250 ohms.

A further pair of triodes is provided, identified by the reference numerals 30 and 31. The triode 30 includes a cathode 32, an anode 33 and a control electrode 34. The triode 31 includes a cathode 35, an anode 36 and a control electrode 37. The control electrode 34 is directly connected to anode 16 and the control electrode 37 directly to the anode 26. The anodes 33 and 36 are directly connected together, and to the positive terminal of a second D. C. voltage source 40, the negative terminal of which is connected to the reference point 11. The source 40 provides an appreciably higher voltage than does the source 20, and suitable exemplary values of 410 v. and 370 v., respectively, have been employed in a practical embodiment of the present invention.

The cathodes 32 and 35 are connected together via three resistances in series, the outer resistances 41 and 42 of the three being equal and the intermediate resistance 43 having a variable tap 44, and acting as a voltage divider. The center tap 44 is connected directly to the control electrode 23, and via a resistance 45 and an adjustable source of negative voltage 46 (60–90 v.) to the reference point 11. A suitable value for resistances 41 and 42 is 47K, while voltage divider 43 may suitably have a value of 10K.

In effect, the source 46 is connected via resistance 45 between reference point 11 and grid 23, and is selected to maintain grid 23 negative with respect to reference point 11 by one to two volts.

In operation, when a signal is impressed on grid 13, or between grid 13 and reference point 11, amplification occurs in triode 14, the signal appearing with 180° phase reversal at anode 16, and at grid 34. The signal at grid 34 modulates current flow through triode 30, effecting current flow in cathode resistance 41, in the upper part of resistance 44, and through resistance 45 and source 46 to reference point 11.

The voltage at control electrode 23 consists of bias voltage deriving from source 46, with superposed signal voltage developed across resistance 45. Since the signal at tap 44 is 180° out of phase with the signal at grid 13, the grid 23 is driven 180° out of phase with the signal at grid 13.

The signal at grid 23 is amplified in triode 24 and appears with 180° phase reversal at anode 26. The latter signal is applied to the grid 37 of triode 35, and effects signal current flow through resistance 42 and the lower half of voltage divider 43, proceeding via the tap 44, resistance 45 and voltage source 46 to reference point 11. Signal currents in resistances 41 and 42 are thus 180° out of phase, respectively, and these currents flow in resistance 45, where they tend to cancel. The circuit so operates that cancellation is not, and cannot be, complete, since it is the difference signal which drives triode 24.

The signals at cathodes 32 and 35 are 180° out of phase, and may be derived via coupling resistors 42, 43, on leads 44, 45. These signals may be brought to equality by adjustment of tap 44, which varies the relative values of the two out-of-phase signal currents in resistance 45, until an adequate difference value is provided to drive triode 24.

The voltage of source 46 is selected to provide suitable negative bias at grids 34 and 37, having regard for the positive D. C. voltages at grids 34 and 37, deriving from source 20, and the positive D. C. voltages at cathodes 32, 35 deriving from voltage source 40.

Since the signal voltages at opposite ends of resistance 22 are approximately equal and 180° out-of-phase, resistance 22 can be thought of as two resistances whose sum is equal to resistance 22 with their junction point connected to the common point 11, as far as the signal voltage is concerned.

However, since the resistance is floating between control electrode 13 and control electrode 23, this imaginary junction is free to appear at the point which represents balance for the particular signal at which the circuit is operating.

When electrode 13 is fed from a low impedance source, feedback through resistance 22 is negligible. However, when electrode 13 is fed from a source whose impedance approaches infinity, approximately 6 db of negative feedback is applied via resistance 22 to control electrode 13.

The freedom of the balance point on resistance 22 to appear where conditions dictate is an important factor in overall stability of the inverter. Since control electrode 23 is connected directly to tap 44, which, due to the heavy negative feedback looks like an extremely low impedance source, the input signal from terminal 10 cannot have any appreciable effect on electrode 23 through the high impedance of resistance 22.

By employing suitable values of input capacitors 12, and with capacitors 47 and 48 added to the circuit, in parallel with resistors 41, 42, respectively, the response of the present system is excellent in the supersonic range. The response will go as high as 500 kc. with 2 or 5 db drop in amplification factor. Both sides of the inverter, at cathode 32 and 35, are equal in signal output at a given frequency.

The source 46 serves not only to reduce the steady voltage at cathodes 32, 35 but also provides bias voltage for grids 23 and 13. The resistance 22 taken with resistance 45 serves as a voltage divider for the input signal, reducing the latter as applied to grid 23.

If desired, capacitor 47 may be connected between cathode 32 and tap 44, and capacitor 48 between cathode 35 and tap 44, even for audio frequency operation. The capacitors may be adjustable, and of such values that they affect operation of the circuit only at extremely high frequencies. At these frequencies their function is to adjust phase shifts.

Triodes 14 and 25 may each be one-half of a 12AX7 dual triode, and triodes 30 and 31 may each be one-half of a 12AU7 dual triode.

With these tubes and the circuit values and voltage values herein specified by way of example, it has been found that frequency response is flat to within 1 db from D. C. to 85 kc., that the balance between sides of the amplifier is maintained within .3 of 1% to 110 kc., and that a gain of 135 may be obtained at 1 kc., operation at 0.2 v. in resulting in 27 v. push-pull out, and that negligible distortion occurs to at least 40 volts output.

The phase inverter described and illustrated herein is capable of directly driving a Class $AB^1$ or Class $AB^2$ and/or Ultra linear push-pull output stage, or a Class B output stage, and since the output impedances of the present invention are cathode loads the driven impedance as seen from an output stage may be low. The output stages referred may be driven from cathodes 32, 35 directly in the case of audio high fidelity operation, for ultra-sonic operation output coupling capacitors 50, 51 may be employed.

The circuit is self-balanced in respect to signal, and also in respect to bias, despite normally expected variations in tube constants and circuit parameters. All elements of the circuit are D. C. coupled, which eliminates low frequency phase shift between sides of the amplifier. The use of two cathode follower output tubes establishes a balance due to shunt capacity to ground at high frequencies, and the fact that the triode sections 14 and 24 are both anode loaded, provides the same advantage in the input portion of the system.

Once complete balance of the system has been attained by proper adjustment of tap 44, for any one frequency, or for D. C., the circuit is balanced for all frequencies within its capabilities.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A phase inverter, comprising a first vacuum tube having a first anode, cathode and grid, a second vacuum tube having a second anode, cathode and grid, a third vacuum tube having a third anode, cathode and grid, a fourth vacuum tube having a fourth anode, cathode and grid, a point of fixed reference potential connected to said first and second cathodes, means for applying input signal between said first grid and said point of reference potential, a first anode load for said first vacuum tube, a second anode load for said second vacuum tube, a source of first anode voltage connected from said point of reference potential via said first anode load to said first anode and via said second anode load to said second anode, an impedanceless connection from said third grid to said first anode, an impedanceless connection from said fourth grid to said second anode, a source of second anode voltage greater than said first voltage, means connecting said source of second anode voltage from said point of reference potential directly to said third and fourth anodes in parallel, first, second and third cathode load resistances connected in series in the stated order between said third cathode and said fourth cathode, said first and third cathode load resistances being equal, a tap to a point of said second resistance, a source of further voltage having a positive terminal and a negative terminal, a direct connection from said positive terminal to said point of reference potential, a further resistance, means connecting said negative terminal via said further resistance to said tap, another resistance, a connection from said tap via said another resistance to said first grid, an impedanceless connection from said tap to said second grid and means for connecting a load to said phase inverter.

2. The combination according to claim 1, wherein said further voltage is greater than the difference between said first and second anode voltages.

3. An amplifier including first, second, third and fourth vacuum tubes, each of said vacuum tubes having an anode, a cathode and a control electrode, means connecting the cathodes of said first and second vacuum tubes to a point of reference potential, a signal input terminal, means connecting said signal input terminal to the control electrode of said first vacuum tube, means including a high resistance for connecting said signal input terminal to the control electrode of said second vacuum tube, an anode load resistance for said first vacuum tube, an anode load resistance for said second vacuum tube, a source of B+ voltage connected from said point of reference potential and in series with each of said anode load resistances, a D. C. connection from the anode of said first vacuum tube to the control electrode of said third vacuum tube, a D. C. connection from the anode of said second vacuum tube to the control grid of said fourth vacuum tube, a first cathode resistance in series with the cathode of said third vacuum tube, a second cathode resistance in series with the cathode of said fourth vacuum tube, a potentiometer resistance connecting said first and second cathode resistances, a D. C. connection from a point of said potentiometer resistance to the grid of said second vacuum tube, a bias resistance, a source of negative bias voltage connected in series with said bias resistance between said point of reference potential and said point of said potentiometer resistance, a source of B+ voltage connected between said point of reference potential and the anodes of said third and fourth vacuum tubes and means for connecting a load to said amplifier.

4. The combination according to claim 3, wherein said means for connecting a load to said amplifier comprises output leads connected with the cathodes of said third and fourth vacuum tubes.

5. An amplifier, including a first vacuum tube having a first anode, cathode and grid, a second vacuum tube having a second anode, cathode and grid, a third vacuum tube having a third anode, cathode and grid, a fourth vacuum tube having a fourth anode, cathode and grid, a D. C. connection from each of said first and second cathodes to a point of reference potential, means for connecting a single ended source of input signal between said first grid and said point of reference potential, a relatively large resistance connected between said first grid and said second grid, a load impedance connected in push-pull relation to said third and fourth vacuum tubes, a source of driving voltage for said second grid, said source of driving signal for said second grid having a phase in precise opposition to the phase of said input signal, said source of driving signal including said load impedance, means for connecting said third and fourth vacuum tubes in balanced push-pull relation, and means for driving said third and fourth vacuum tubes in balanced driven relation from said first and second vacuum tubes.

6. An amplifier, including a first vacuum tube having a first anode, cathode and control electrode, a second vacuum tube having a second anode, cathode and control electrode, a third vacuum tube having a third anode, cathode and control electrode, a fourth vacuum tube having a fourth anode, cathode and control electrode, a D. C. connection from each of said first and second cathodes to a point of reference potential, means for connecting a single ended signal source between said first control electrode and said point of reference potential, a first resistive anode load connected between a B+ terminal and said first anode, a second resistive anode load connected between said B+ terminal and said second anode, said first and second anode loads being substantially equal, a low impedance D. C. connection between said first anode and said third control electrode, a low impedance D. C. connection between said second anode and said fourth control electrode, a relatively high resistance connected between said first and second control electrodes, a resistive network connected in series between said third and fourth cathodes, a B+ terminal connected jointly to said third and fourth anodes, a D. C. low impedance connection between a tap on said resistive network and said second control electrode, a bias resistance, a source of negative bias voltage for said third and fourth control electrodes having a magnitude adequate to maintain said third and fourth control electrodes negative with respect to said third and fourth cathodes, respectively, said bias resistance being connected in series with said source of negative bias voltage between said point of reference potential and said tap, said tap being selected to provide driving signal voltage at said second control electrode having a value such as to effect balanced drive of said third and fourth vacuum tubes by said first and second vacuum tubes in response to signal input voltage applied between said first control electrode and said point of reference potential.

7. In combination, a first vacuum tube having a first anode, cathode and control grid, a second vacuum tube having a second anode, cathode and control grid, a third vacuum tube having a third anode, cathode and control grid, a fourth vacuum tube having a fourth anode, cathode and said control grid, means connecting said first and second cathodes to a point of reference potential, a single ended input circuit coupled between said first control grid and said point of reference potential for applying signal voltage, a relatively high resistance connected between said first and second control electrodes, anode loads connected to said first and second anode, an impedance network connected between said third and fourth cathodes, further impedance connected between a point of said impedance network and said point of reference potential, a D. C. connection between said first anode, and said third control grid, a D. C. connection between said second anode and said fourth control grid, a D. C. connection between a point of said impedance network and said second control grid, said point of said impedance network being at signal voltage of phase opposite to the phase of the signal voltage applied to said first control grid by said single ended input circuit and of a magnitude selected to provide balanced signal voltage across said impedance network.

8. A phase inverter for inverting a signal derivable from a single ended source, comprising a push-pull first stage having a first and a second side, a push-pull second stage having two sides, means for driving said second stage in push-pull relation from said first stage, means for driving said first side of said first stage in single ended relation from said single ended source at a first level and in a first phase in response to said signal, means for driving said second side of said first stage at a second level lower than said first level and in said first phase from said single ended source in response to said signal, and means for driving said two sides of said first stage from said second stage in the same phase and in such phase and in such amplitudes respectively as to provide balanced output signal from said push-pull second stage.

9. A system of phase inversion, comprising a first amplifier having a first cathode, anode and control electrode, a second amplifier having a second cathode, anode and control electrode, a third amplifier having a third anode, cathode and control electrode, a fourth amplifier having a fourth anode, cathode and control electrode, signal input terminals coupled via a low impedance between said first control electrode and a point of reference potential, means connecting said first and second cathodes to said point of reference potential, a relatively high resistance connected between said first and second control electrodes, first and second equal anode load resistances, a source of B+ voltage having a negative terminal connected to said point of reference potential, said source of B+ voltage having a positive terminal connected via said first and second equal anode load resistances in parallel, respectively, to said first and second anodes, respectively, a direct D. C. connection from said first anode to said third control electrode, a direct D. C. connection from said second anode to said fourth control electrode, a cathode resistance network joining said third and fourth cathodes, a source of anode voltage connected from said point of reference potential to said third and fourth anodes in parallel, a source of bias voltage having a positive terminal connected to said point of reference potential, and a negative terminal, a resistance connected in series with said source of bias voltage to a point of said cathode resistance network, a D. C. direct connection between said point of said cathode resistance network and said second control electrode, means for selecting said point of said cathode resistance to provide signal of equal amplitudes and opposite phases with respect to said point of reference potential at said third and fourth cathodes, respectively, and means for deriving balanced output signal from said system.

10. The combination according to claim 9, wherein said last means comprises leads connected to said third and fourth cathodes, respectively.

11. An amplifier including first, second, third and fourth vacuum tubes, each of said vacuum tubes having an anode, a cathode and a control electrode, means connecting the cathodes of said first and second vacuum tubes to a point of reference potential, a signal input terminal, means connecting said signal input terminal to the control electrode of said first vacuum tube, means including a high resistance for connecting said signal input terminal to the control electrode of said second vacuum tube, an anode load resistance for said first vacuum tube, an anode load resistance for said second vacuum tube, a source of B+ voltage connected from said point of reference potential and in series with each of said anode load resistances, a D. C. connection from the anode of said first vacuum tube to the control electrode of said third vacuum tube, a D. C. connection from the anode of said second vacuum tube to the control grid of said fourth vacuum tube, a resistive network comprising at least one resistance connected between said first cathode and said second cathode, a tap on said resistive network, a D. C. connection from said tap to the grid of said second vacuum tube, a bias resistance, a source of negative bias voltage connected in series with said bias resistance between said point of reference potential and said tap, a source of B+ voltage connected between said point of reference potential and the anodes of said third and fourth vacuum tubes, and means for connecting a load to said amplifier.

References Cited in the file of this patent

UNITED STATES PATENTS

| | | |
|---|---|---|
| 2,248,852 | Cannon | July 8, 1941 |
| 2,446,025 | Rockwell | July 27, 1948 |
| 2,626,321 | Wen Yuan Pan | Jan. 20, 1953 |
| 2,714,137 | Dzwons | July 26, 1955 |
| 2,747,030 | Nuckolls | May 22, 1956 |